US012722318B2

(12) United States Patent
Menzolini et al.

(10) Patent No.: US 12,722,318 B2
(45) Date of Patent: Sep. 1, 2026

(54) CAPSULE CUTTING APPARATUS AND METHOD

(71) Applicant: SACMI COOPERATIVA MECCANICI IMOLA SOCIETA' COOPERATIVA, Imola (IT)

(72) Inventors: Ruggero Menzolini, Imola (IT); Matteo Venturini, Imola (IT)

(73) Assignee: CALEFFI S.p.A. (IT)

( * ) Notice: Subject to any disclaimer, the term of this patent is extended or adjusted under 35 U.S.C. 154(b) by 482 days.

(21) Appl. No.: 18/324,656

(22) Filed: May 26, 2023

(65) Prior Publication Data

US 2023/0381994 A1 Nov. 30, 2023

(30) Foreign Application Priority Data

May 31, 2022 (IT) ........................ 102022000011495

(51) Int. Cl.
*B26D 3/08* (2006.01)
*B26D 5/08* (2006.01)
*B26D 5/12* (2006.01)
*B26D 7/22* (2006.01)

(52) U.S. Cl.
CPC ............... *B26D 3/08* (2013.01); *B26D 5/086* (2013.01); *B26D 5/12* (2013.01); *B26D 7/22* (2013.01)

(58) Field of Classification Search
CPC . B26D 3/08; B26D 5/086; B26D 5/12; B26D 7/22; B26D 7/24; B26D 5/04; B26D 5/06; B26D 1/02; B26D 7/0625; B26D 1/01; B26D 5/16; B26D 7/00; B26F 2210/04; B26F 1/18; Y10T 83/647
See application file for complete search history.

(56) References Cited

U.S. PATENT DOCUMENTS 3,858,474 A * 1/1975 Kuts ...................... B29D 30/46 83/675
4,666,053 A * 5/1987 Corcoran ................. B26D 9/00 215/252
4,693,157 A * 9/1987 Looser ................. B26D 1/0006 83/955
5,761,976 A * 6/1998 Bailey ...................... B26D 1/02 83/955
2012/0285302 A1* 11/2012 Bergami .................. B26D 3/08 83/13

FOREIGN PATENT DOCUMENTS

WO WO2011058500 A1 5/2011

* cited by examiner

*Primary Examiner* — Jonathan G Riley
(74) *Attorney, Agent, or Firm* — Laubscher & Fretwell, P.C.

(57) ABSTRACT

A cutting apparatus and method are disclosed for making a tamper device of a closing capsule, in which the capsule is fed to a cutting device on which simultaneously a first force is exerted that maintains a cutting portion of the device in an operative cutting position and a second force that would tend to make the cutting portion retreat to a safety position, the first force being greater than the second force and in which in the event of an anomalous situation like an interruption to an electric power supply, the first force is reduced so that the second force can exceed the first force and move the cutting portion to the safety position.

12 Claims, 10 Drawing Sheets

CAPSULE CUTTING APPARATUS AND METHOD

BACKGROUND OF THE INVENTION

The invention relates to a cutting apparatus and method for making incisions in capsules, in particular for capsules made of plastics of the type used for closing containers, like for example bottles.

Specifically, but not exclusively, the invention relates to an apparatus and a method for making incisions in capsules to close containers in order to make one or more preferential weakening lines to form a tamper device that is suitable for testifying that the container was first opened.

In a cutting apparatus for cutting capsules, as known, feeding the capsules comprises a rolling movement of the capsules on the cutting device. The movement of the capsule feeding arrangement (in particular of the capsule-holding spindle that in general has a rotation motion on itself and a rotation movement around an axis of a spindle-holding carousel) has to be controlled precisely so as to be coordinated (in other words, "in phase") with the position of the cutting device, in particular with the position of the vertical and/or oblique cuts of the cutting device, so that the respective preferential weakening lines are obtained in desired positions on the circumference of the capsules.

One of the drawbacks of the prior art consists of the fact that, in the event of a block of the cutting apparatus (for example because of an interruption to the electric energy) or in other anomalous and/or emergency situations, it is possible that the capsule feeding arrangement will lose coordination ("phasing") with the cutting device, with the resulting risk of damage to the capsule feeding arrangement and/or to the cutting device and/or to the capsules.

In fact, if the capsule feeding arrangement is not angularly "in phase" with the cutting device, on one side, the blades can damage or ruin the capsules and/or the feeding arrangement (for example the capsule-holding spindles arranged on a rotatable carousel), and, on the other side, the blades, which are particularly delicate, can be easily subject to a high risk of deterioration.

SUMMARY OF THE INVENTION

One object of the present invention is to provide cutting apparatus and/or method with a safety system that is able to preserve the capsules and/or the components of the apparatus, in particular the cutting elements and/or transport spindles of the capsules.

One advantage is to ensure the integrity of the capsules and/or the components of the cutting apparatus, also in the event of a block of the cutting apparatus or interruption to the electrical supply or other emergency situation.

One advantage is to make available a cutting apparatus for cutting capsules that is constructionally simple and cheap.

Such objects and advantages, and still others, are achieved by an apparatus for cutting capsules, including, a carousel rotating around a carousel axis, two or more transport units carried by the carousel, a cutting device, at least one abutment element, and first and second force arrangements. Each of the transport units is configured to transport a capsule along a path defined by a rotation of the carousel. The cutting device includes at least one abutment portion and at least one cutting portion and is capable of assuming at least one first configuration. The abutment portion is against the abutment element and the cutting portion is in an operative position in which it is arranged along the path for cutting a capsule which is transported by the respective transport units and which rolls on the cutting device. There is at least one second configuration in which the cutting portion is in a safety position far from the path so as not to interfere with the capsule and/or with the respective transport unit. The abutment element is configured so that when the abutment portion is against the abutment element, the cutting portion is in the operative position. A first force arrangement exerts a first force suitable for maintaining the abutment portion against the abutment element and the cutting portion in the operative position, and a second force arrangement exerts a second force suitable for moving the cutting portion from the operative position towards the safety position.

At least one abutment element is configured so that when the abutment portion is against the at least one abutment element, the cutting portion is in the operative position. There is a first force arrangement for exerting a first force suitable for maintaining the at least one abutment portion against the at least one abutment element and the cutting portion in the operative position. A second force arrangement is provided to exert a second force suitable for moving the at least one cutting portion from the operative position towards the safety position.

In one embodiment, a cutting apparatus, configured to make a tamper device of a capsule for closing a container, comprises a cutting device provided with a cutting portion, configured to cut a cap that rolls on the cutting device, and with an abutment portion, configured to contact an abutment element for positioning the cutting portion, in which on the abutment portion, during cutting, a first force that maintains the abutment portion in a contact position against the abutment element and maintains the cutting portion in an operative position, and a second force, that would tend to move the abutment element away from and move the cutting portion to a safety position are exerted simultaneously, the second force being nevertheless lower than the first force so that the cutting portion remains in an operative position, and in which, in an anomalous situation, like an interruption to the energy supply, the first force is immediately reduced so that the second force can become greater than the first force and thus rapidly move the cutting portion to the safety position.

The abutment portion and the abutment element may comprise, in particular, two bodies that are susceptible of reciprocal attraction by an electromagnetic force. The abutment portion and the abutment element may comprise, in particular, two wedge bodies coupled with one another with the possibility of adjusting the reciprocal position thereof to define the operative position of the cutting portion.

BRIEF DESCRIPTION OF THE DRAWINGS

The invention can be better understood and implemented with reference to the attached drawings that illustrate embodiments thereof by way of non-limiting example in which.

DETAILED DESCRIPTION

Figure 1:
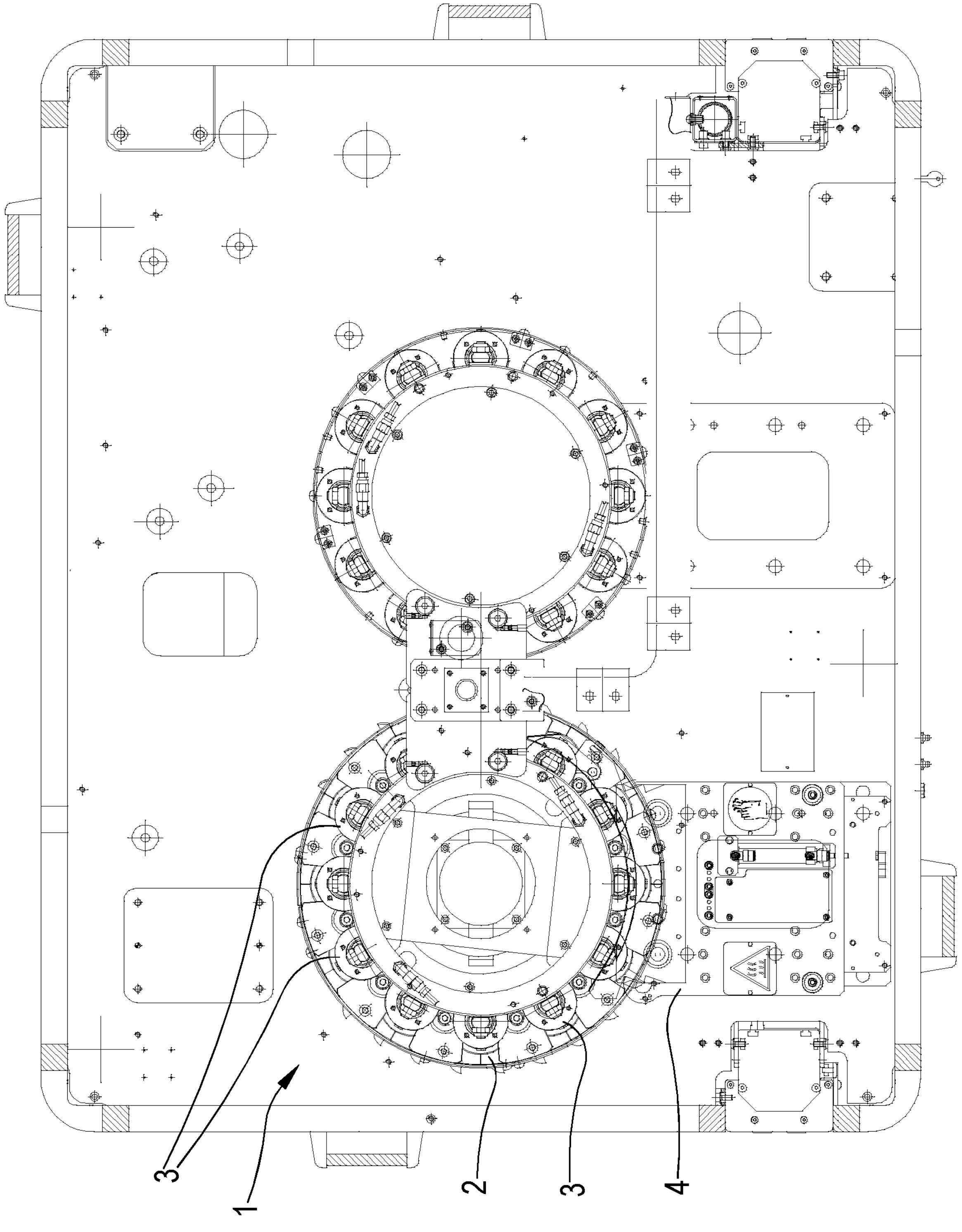
FIG. 1 is a plan view of a production plant for producing closing capsules for containers, in which the plant comprises a first embodiment of a cutting apparatus made according to the present invention, in which the cutting device is in an advanced operative position.

In the figures mentioned above, identical elements of different embodiments are indicated by the same numbers for the sake of simplicity. 1 has been used to indicate overall a cutting apparatus for cutting capsules (caps made of plastics), in particular for making the tamper ring of the caps. The cutting apparatus 1 may be arranged, as in these embodiments, as part of a plant for producing capsules that may include, in particular, one or more other apparatuses for processing the capsules arranged in line with the cutting apparatus 1, like for example a folding apparatus arranged downstream of the cutting apparatus 1 to fold the tamper ring made by the cutting apparatus 1.

The cutting apparatus 1 includes a carousel 2 that is rotatable around a carousel axis, in particular a vertical rotation axis. The cutting apparatus 1 includes two or more transport units 3 carried by the carousel 2. The transport units 3 are arranged angularly spaced apart from one another around the carousel axis. Each transport unit 3 is configured to transport a capsule (cap made of plastics) along a (circular) path defined by a rotation of the carousel 2. Each transport unit 3 may include, in particular, a unit of known type for transporting a closing capsule.

The cutting apparatus 1 includes a cutting device 4 that includes at least one abutment portion 5 and at least one cutting portion 6. The abutment portion 5 will be disclosed further on in the description. The cutting portion 6 may include, in particular, one or more blades (for example to make one or more circumferential cuts on a lateral wall of the capsules made of plastics) and/or one or more vertical and/or oblique blades (for example to make one or more vertical and/or oblique cuts on a side wall of the capsule).

Figure 2:
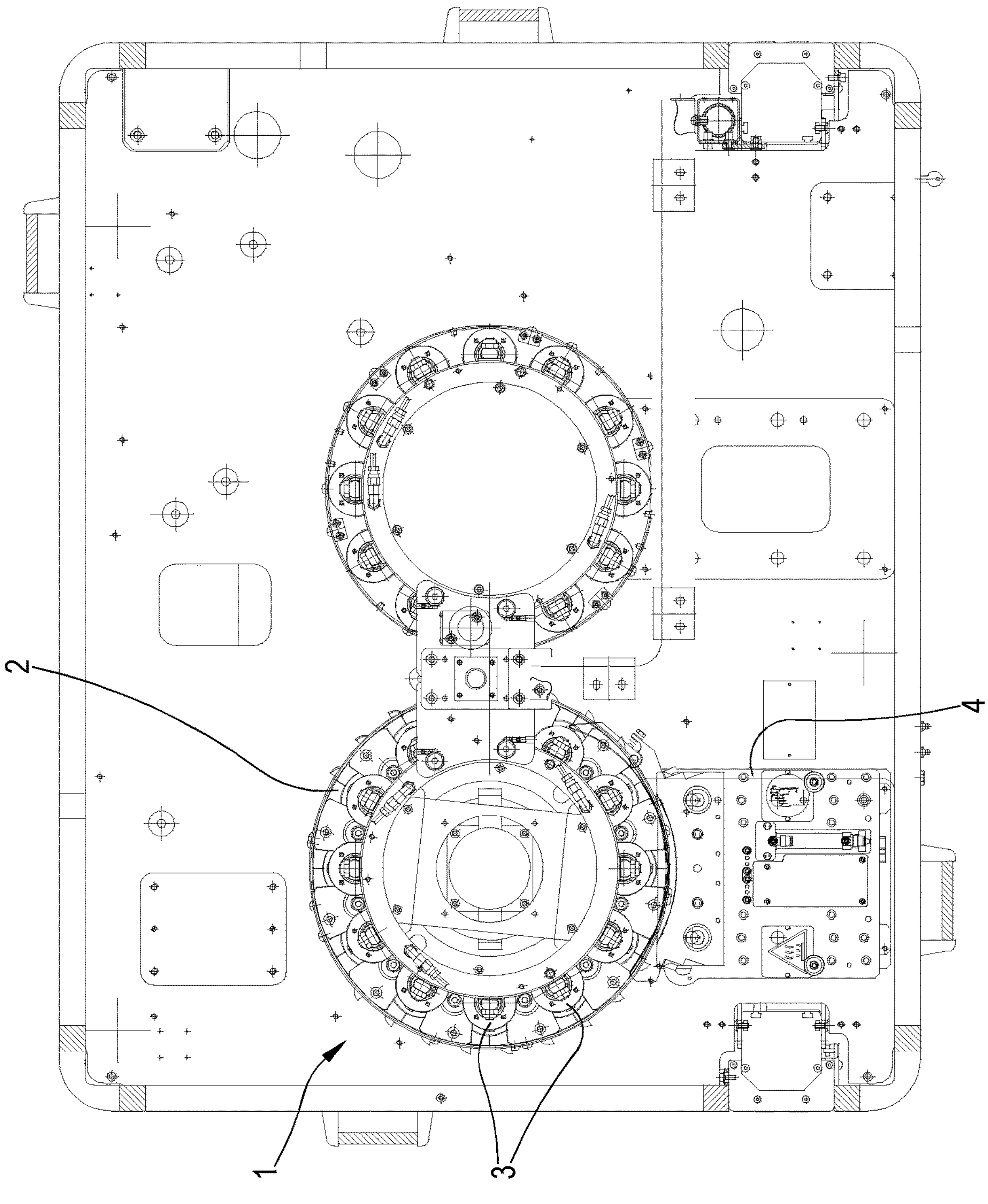
FIG. 2 is the view of FIG. 1 in which the cutting device is in a retracted safety position with respect to the operative position.
Figure 3:
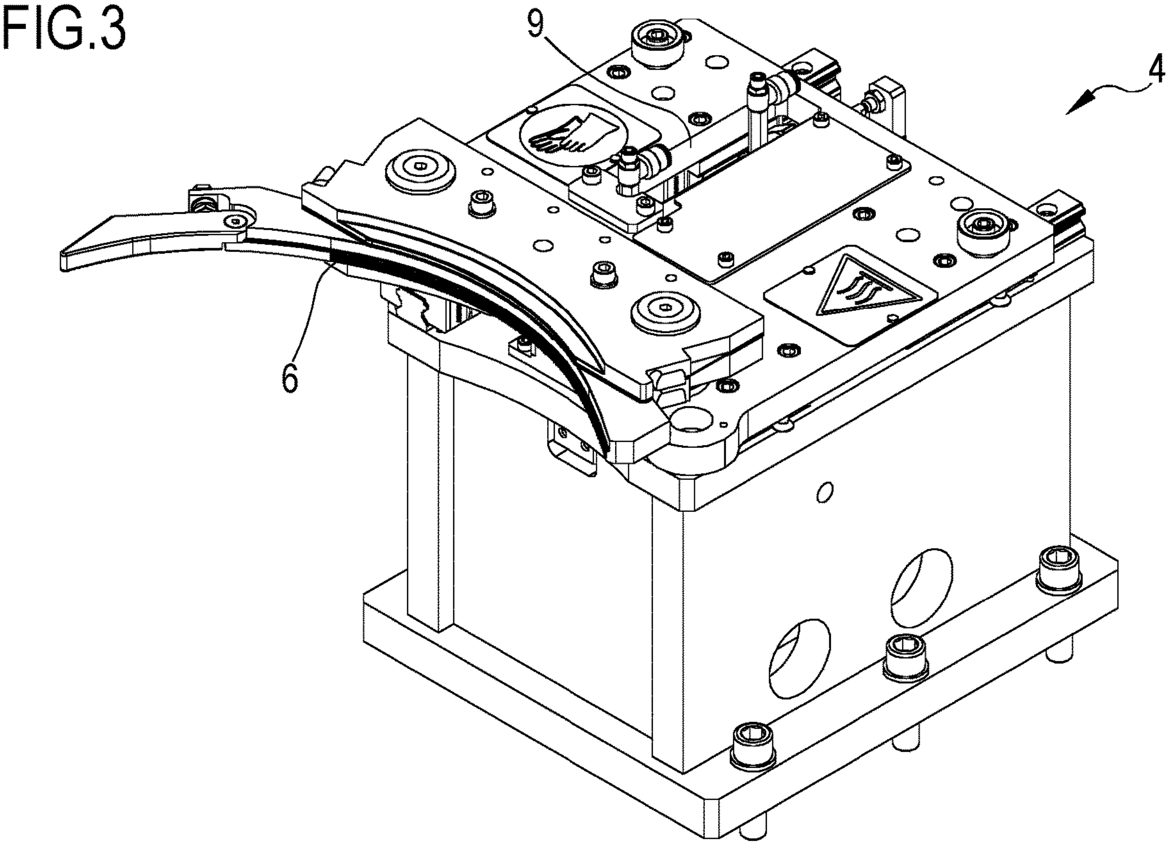
FIG. 3 is a perspective view of the cutting device of the cutting apparatus of FIG. 1 in the advanced operative position.
Figure 4:
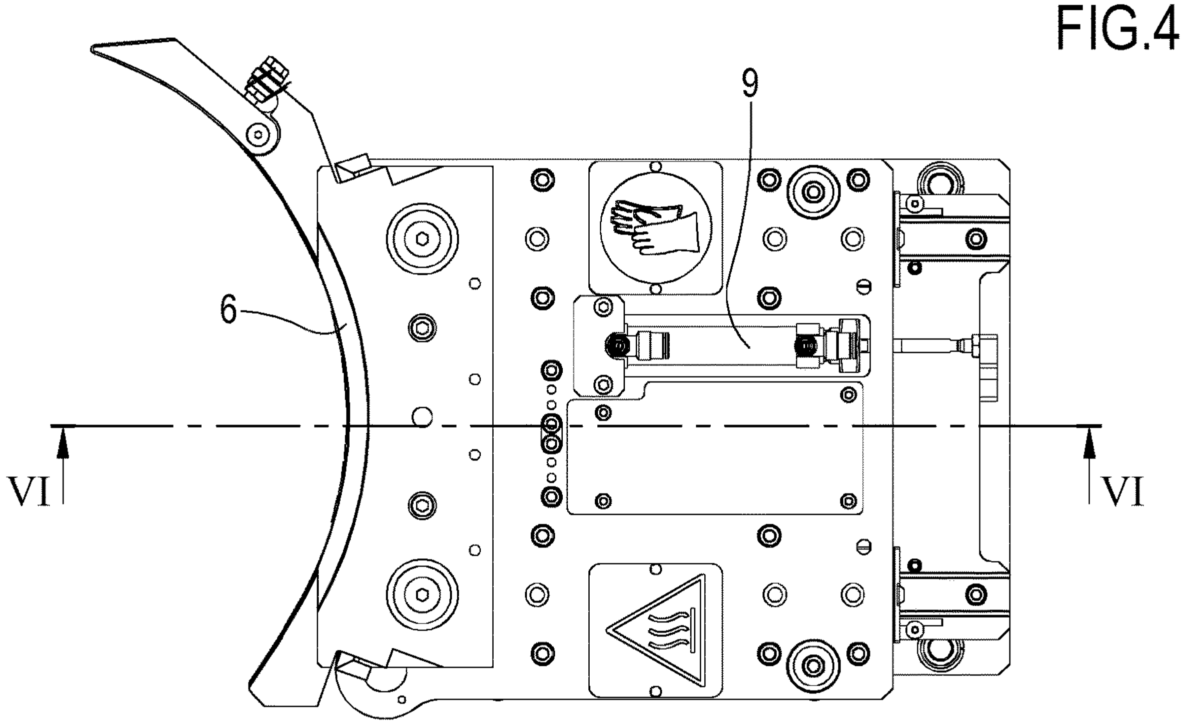
FIG. 4 is a plan view of the cutting device of FIG. 3.
Figure 5:
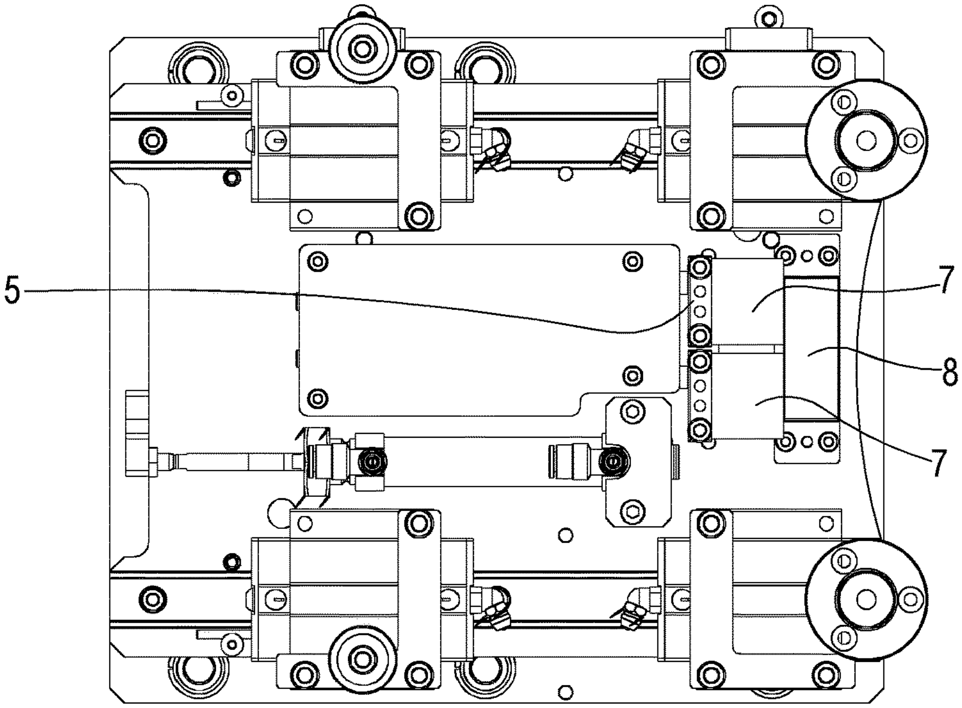
FIG. 5 shows portions of the cutting device of FIG. 3.
Figure 6:
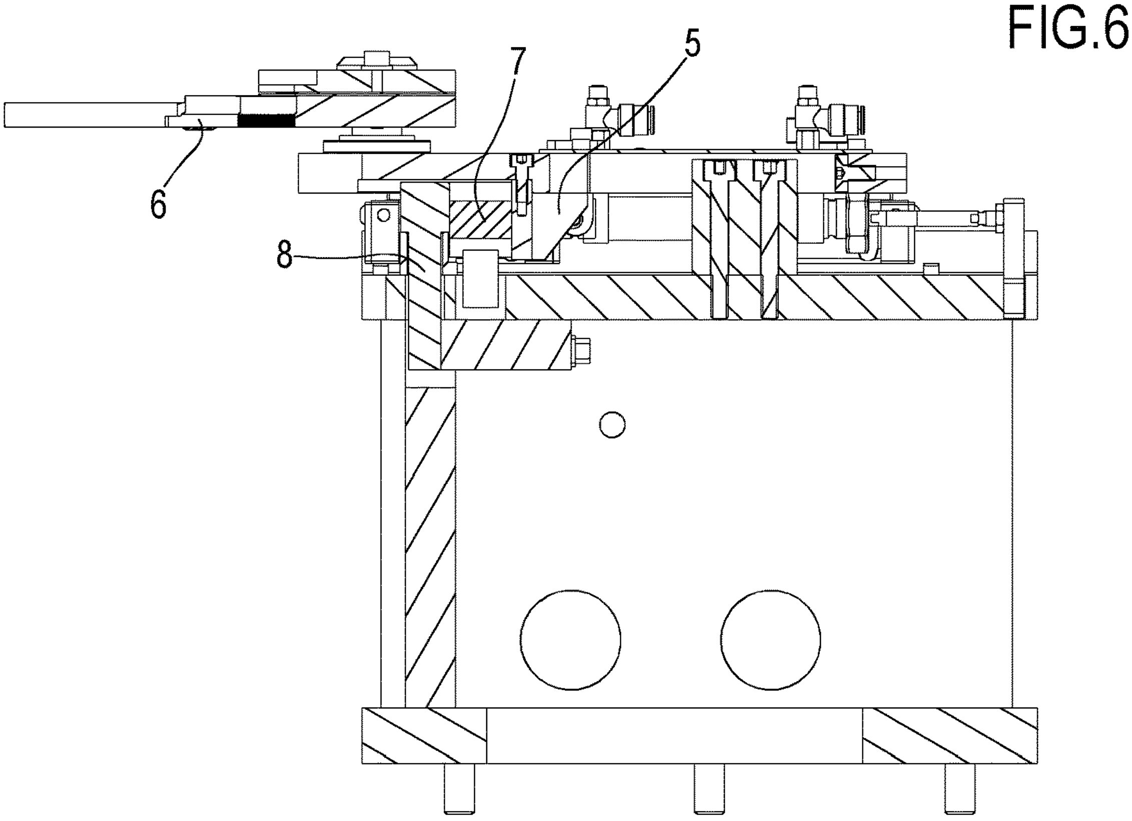
FIG. 6 is section VI-VI of FIG. 4.
Figure 7:
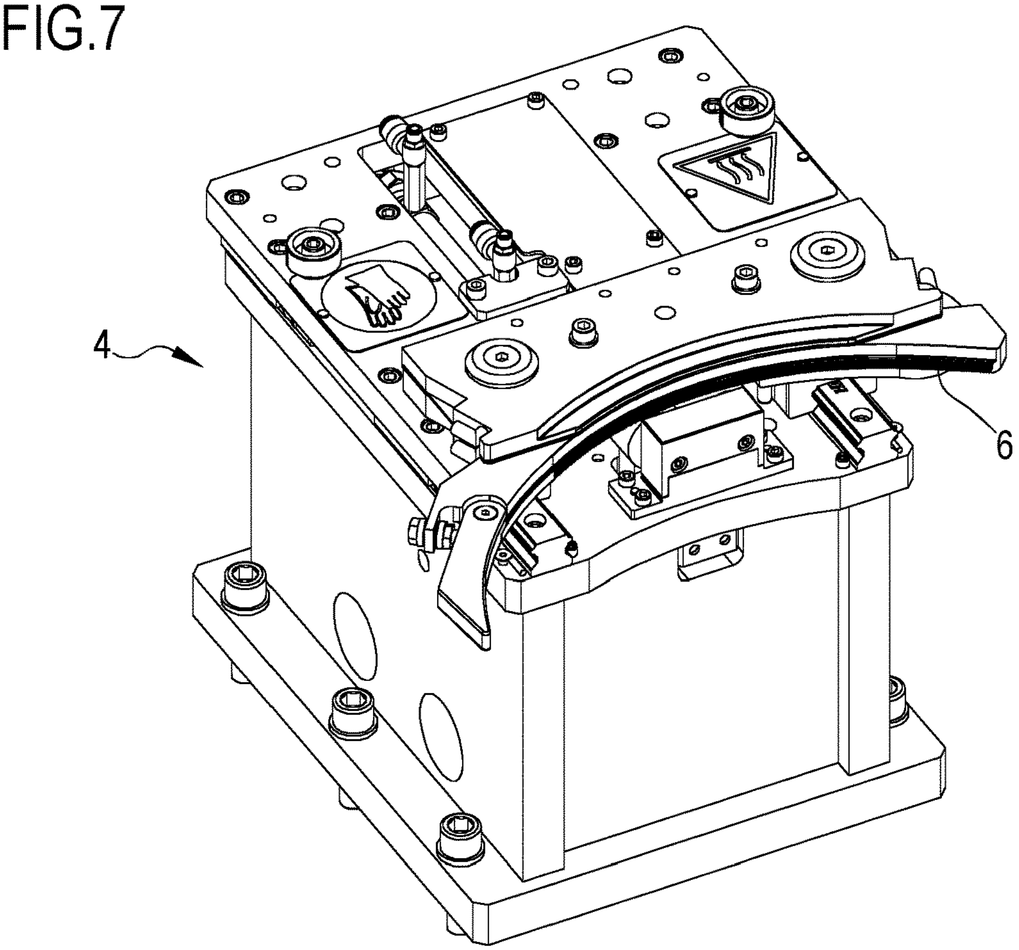
FIG. 7 is a perspective view of the cutting device of the cutting apparatus of FIG. 1 in the retracted safety position.
Figure 8:
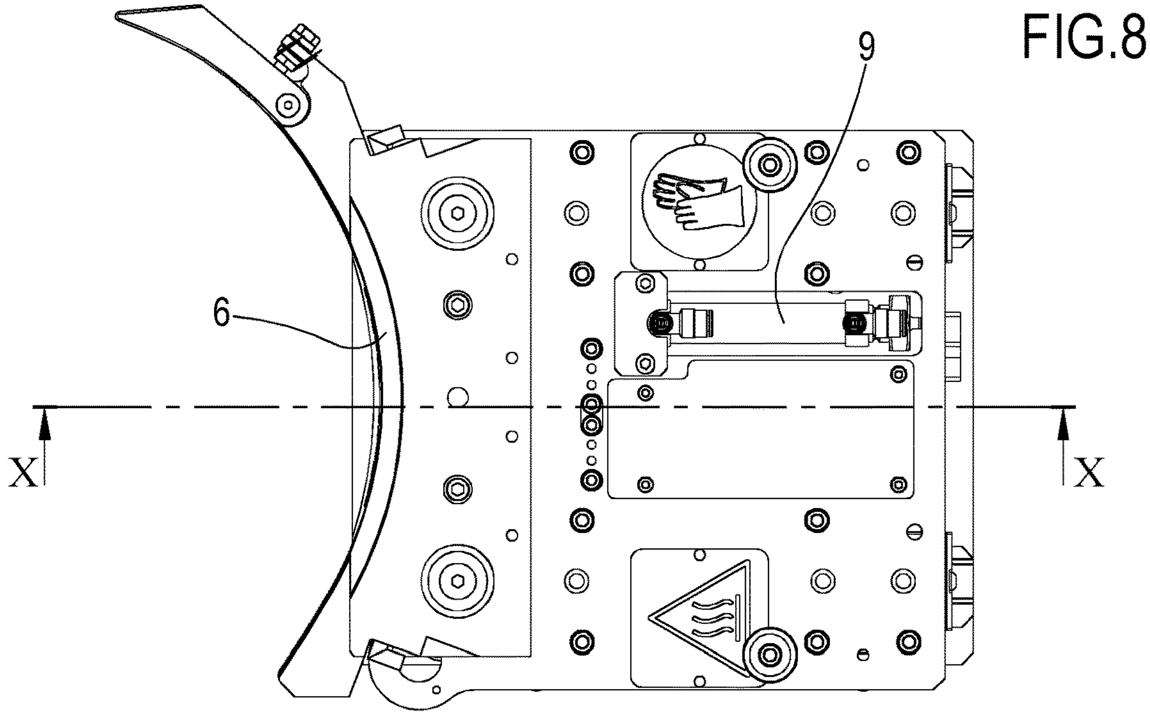
FIG. 8 is a plan view of the cutting device of FIG. 7.
Figure 9:
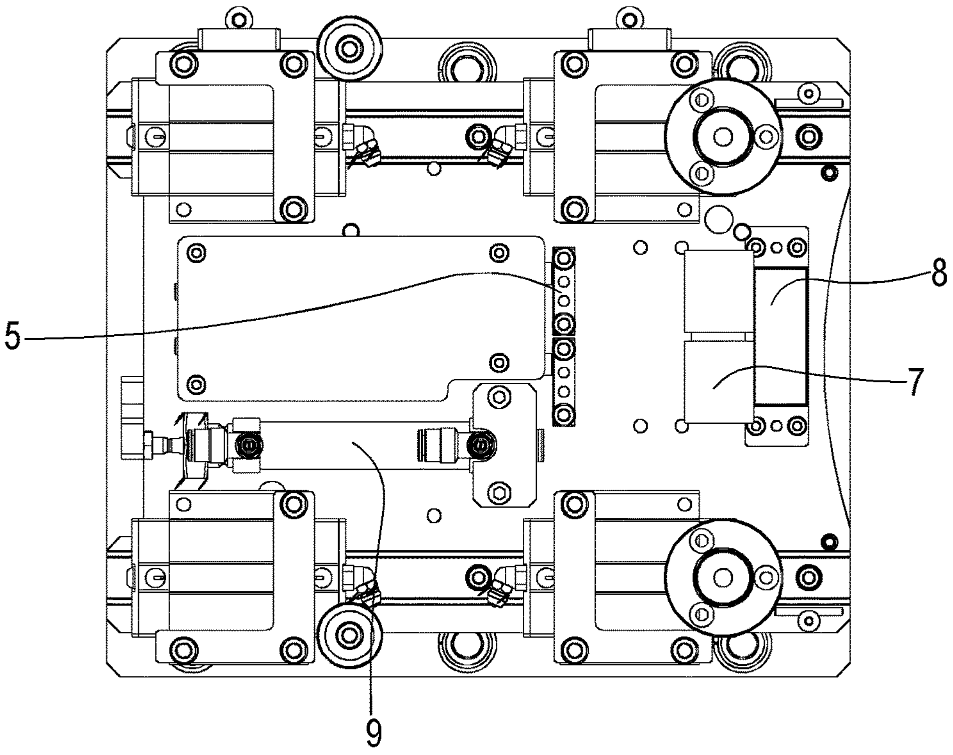
FIG. 9 shows portions of the cutting device of FIG. 7.
Figure 10:
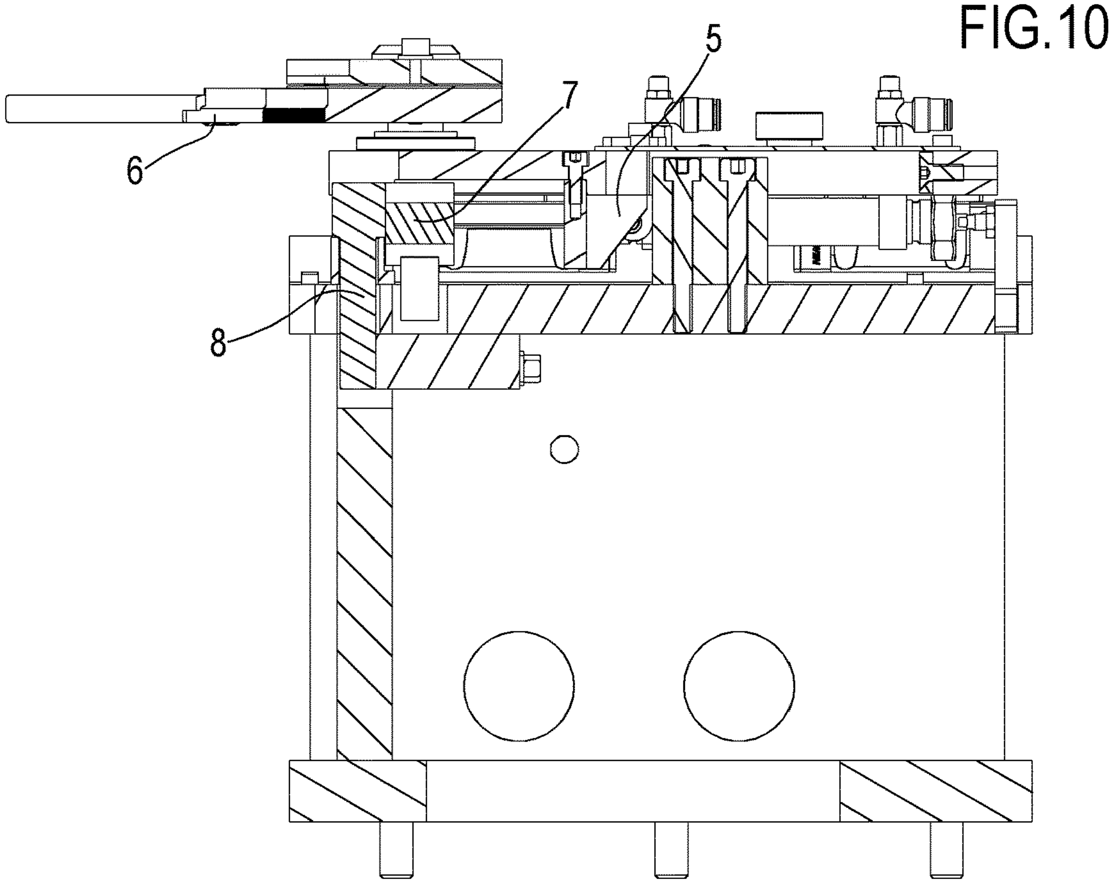
FIG. 10 is section X-X of FIG. 8.
Figure 11:
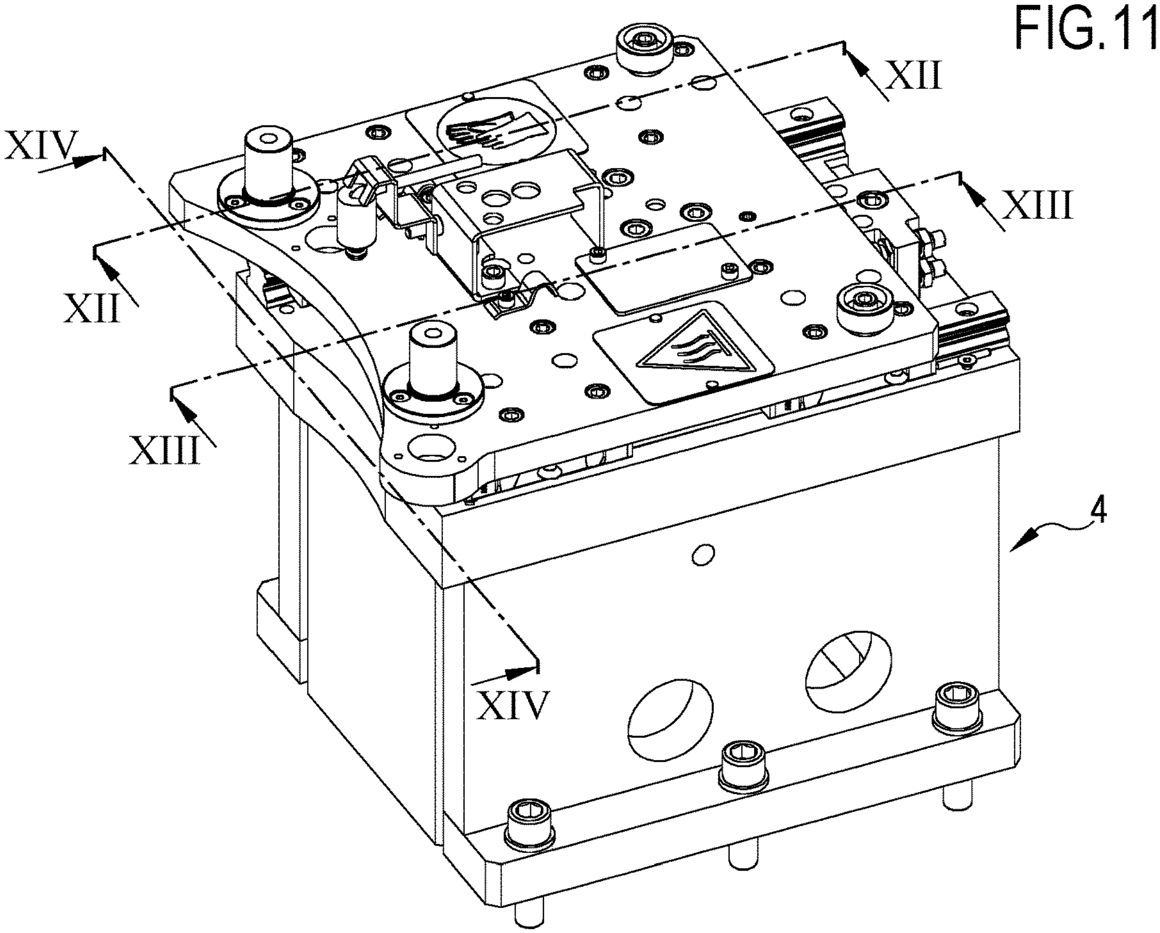
FIG. 11 is a perspective view of the cutting device of a second embodiment of a cutting apparatus made according to the present invention, in which the cutting device is in an advanced operative position.
Figure 12:
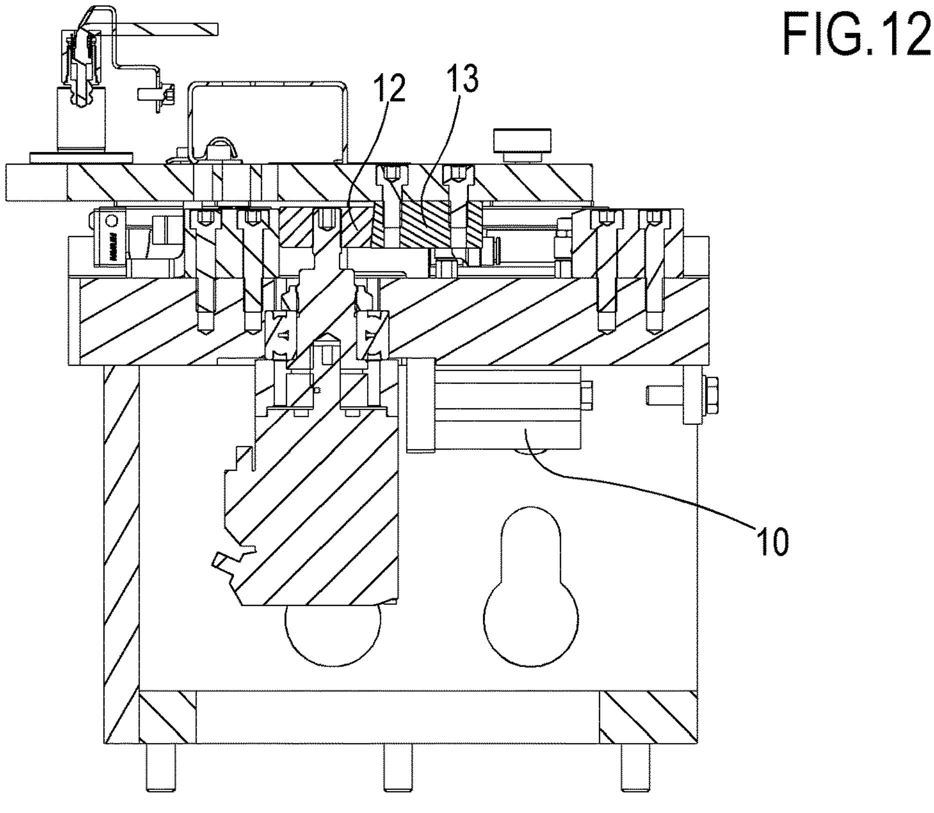
FIG. 12 is section XII-XII of FIG. 11.
Figure 13:
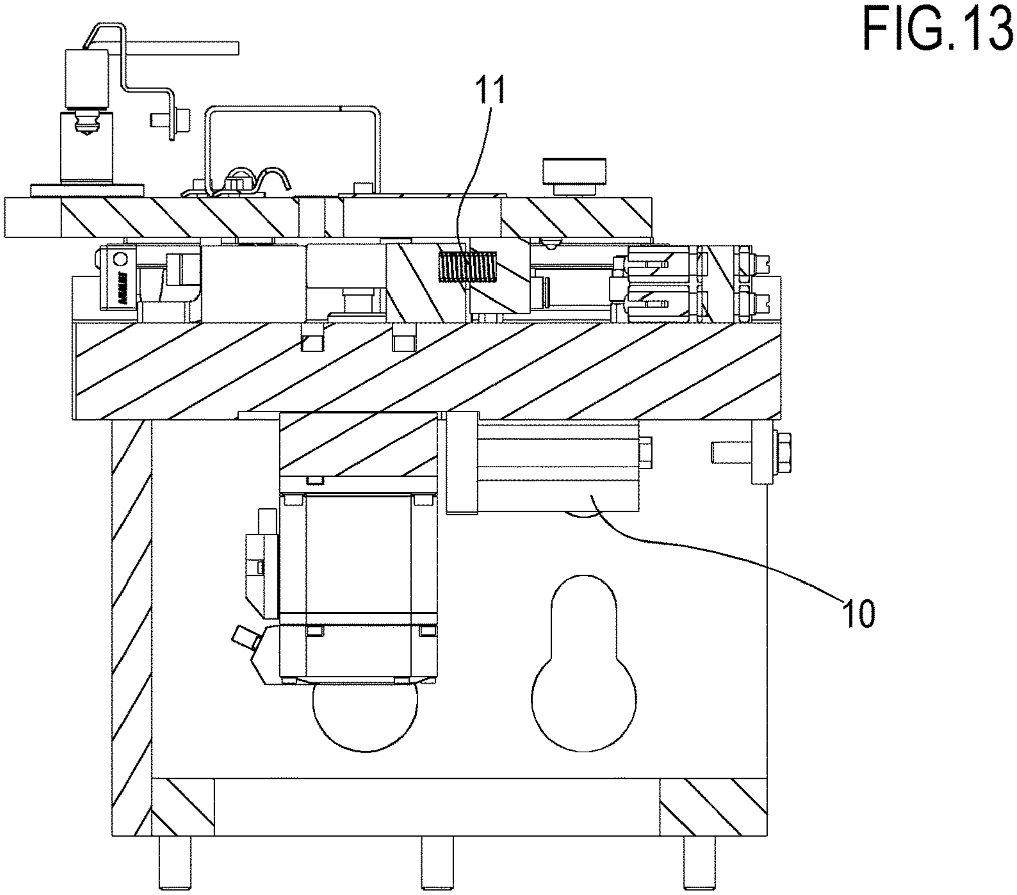
FIG. 13 is section XIII-XIII of FIG. 11.
Figure 14:
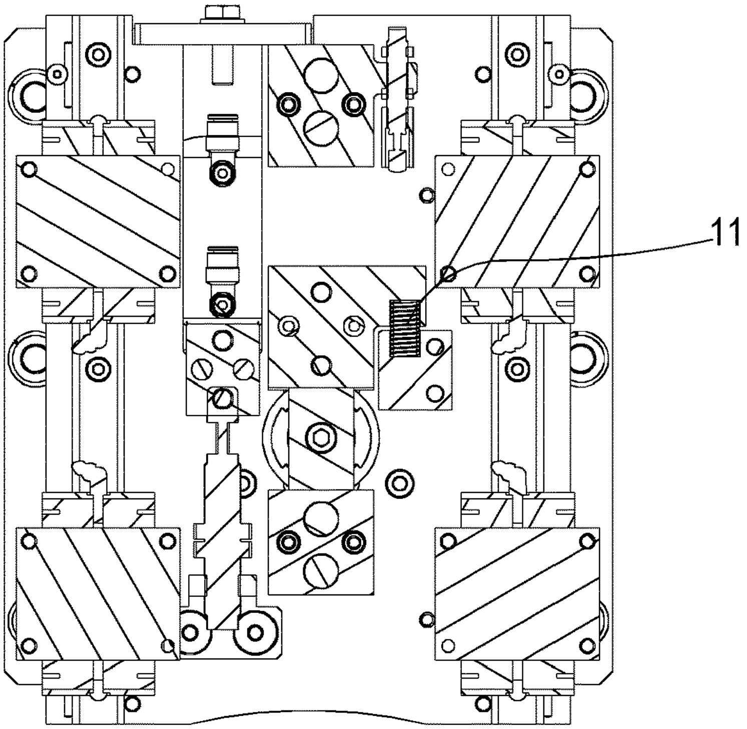
FIG. 14 is section XIV-XIV of FIG. 11.
Figure 15:
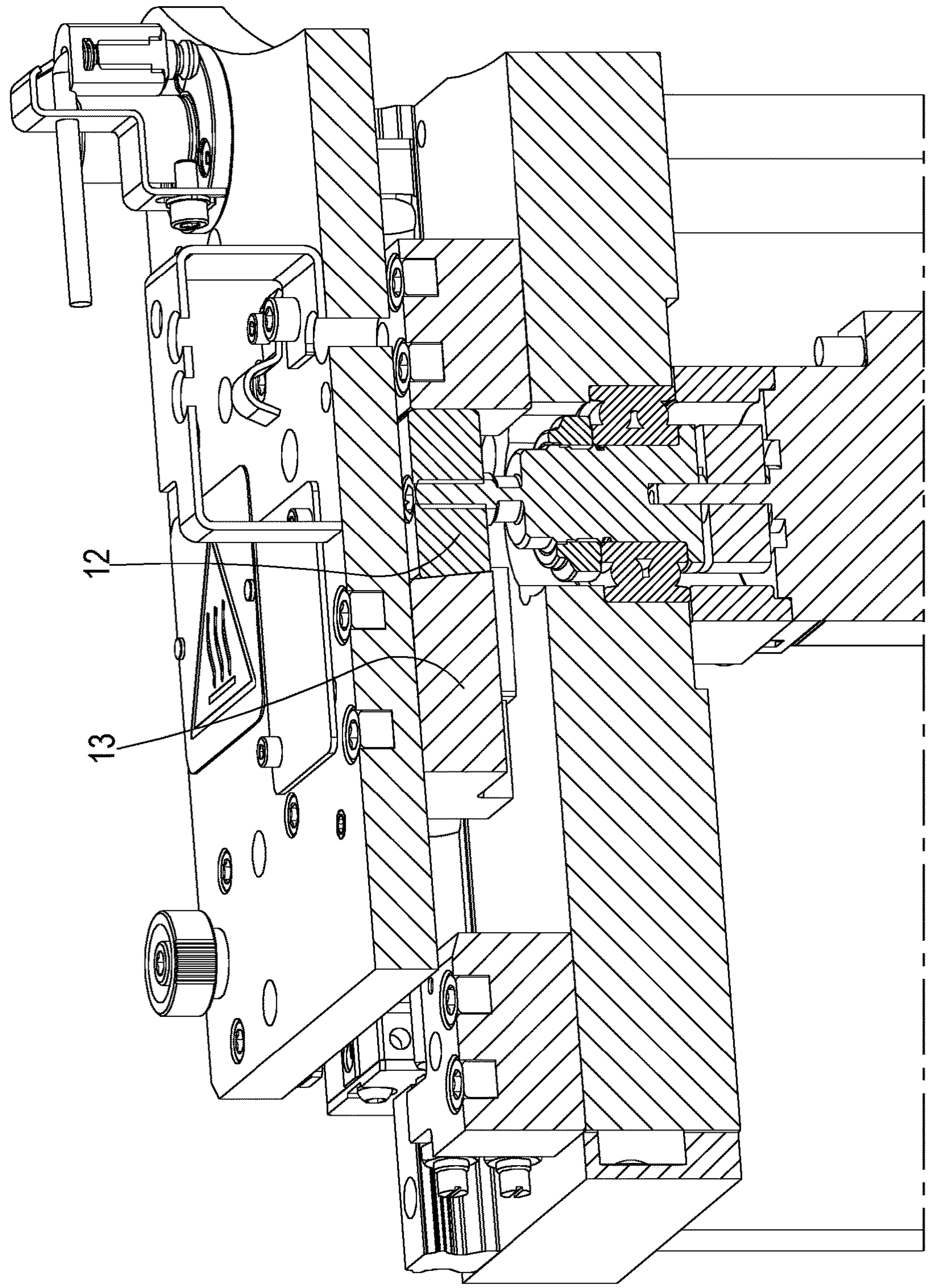
FIG. 15 is a sectioned perspective view of the cutting device of Figure showing the wedge elements.

The cutting device 4 is able to assume at least one first configuration (FIG. 1) in which the abutment portion 5 is arranged to abut against at least one abutment element. This abutment element may include, as in these specific embodiments, an electromagnet 7, as will be explained better further on in the description. In this first configuration of the cutting device 4, the cutting portion 6 is in an (advanced) operative position in which it is arranged along the aforesaid path to cut a capsule, the capsule being transported by the respective transport unit 3 so as to roll on the cutting device 4. The cutting device 4 is able to assume at least one second configuration (FIG. 2), in which the cutting portion 6 is in a safety (retracted) position that is spaced apart from the aforesaid path so as not to interfere with the capsule and/or with the respective transport unit 3.

The cutting apparatus 1 includes at least the aforesaid abutment element (made, in this embodiment, by the electromagnet 7) which is so configured that when the abutment portion 5 is arranged to abut against the electromagnet 7 (that acts as an abutment element), the cutting portion 6 is in the operative position. In practice, the interaction in contact between the abutment portion 5 and the abutment element defines a desired operative position of the cutting portion 6.

The cutting apparatus 1 includes a first force arrangement configured to exert a first force that is suitable to maintain the abutment portion 5 abutting on the abutment element (i.e., in this embodiment, on the electromagnet 7) and the cutting portion 6 in the operative position. The abutment portion 5 may be made, in particular, of ferromagnetic material so that the aforesaid first force is a force of electromagnetic attraction.

The cutting apparatus 1 includes a second force arrangement configured to exert a second force that is suitable for moving the cutting portion 6 from the operative position to the safety position. The direction of the second force may be, in particular, opposite the direction of the first force.

The first force arrangement and the second force arrangement are configured to operate with at least one first control mode or operating control mode, in which the first force (non-nil) and the second force (non-nil) are exerted simultaneously and the first force is greater than the second force, so that the force resulting from the first force and the second force is directed to the first configuration. In practice, the second force remains active and operating to exert an action in a direction that is such as to move away the abutment portion 5 from the abutment element (electromagnet 7) and retract the cutting portion 6 also in normal operating conditions, but in these conditions, in which the cutting portion 6 has to remain in the desired operative position, the second force is exceeded by the first force, so that the cutting device 4 nevertheless remains in the first configuration. In practice, the second force remains active and operating, although it tends to modify the desired operative position, to be ready and triggered in an emergency situation, as will be explained better further on in the description.

The first force arrangement and the second force arrangement are configured to operate with at least one second control mode, or emergency mode, in which at least the first force decreases by becoming less than the second force, so that the resulting force of the first force and of the second force is directed to the second configuration, with consequent retraction of the cutting portion 6 to the safety position.

In the second configuration (emergency mode), it is possible that the first force becomes nil. In the second configuration (emergency mode), it is possible that not only the first force is decreased with respect to the first configuration (for example becoming nil), but that also the second force (non-nil) is decreased with respect to the first configuration, but with a decrease that is less than the decrease of the first force, such that the second force becomes, as said, greater than the first force. In the second configuration (emergency mode), it is possible that the abutment portion 5 moves away from the abutment element (electromagnet 7).

The cutting apparatus 1 may include, in particular, a controller (electronic and programmable) configured to control the first force arrangement and the second force arrangement according to the first mode, or operating control mode, during normal execution of a cut on a capsule.

The first force arrangement may be, in particular, so configured that the emergency mode is triggered by an anomalous situation, in particular by an interruption to the energy (for example electric) supply to the a first force arrangement.

The first force arrangement may include, in particular, an electromagnetic arrangement. The electromagnetic arrangement may include, in particular, the electromagnet 7 that, as has been seen, acts as an abutment element for the desired positioning of the cutting portion 6. The electromagnetic arrangement may include, in particular, a support 8 on which the electromagnet 7 is arranged. The first force may include, in particular, an electromagnetic force, in particular an electromagnetic force arranged to reciprocally attract the abutment portion 5 and the electromagnet 7. The first force arrangement may include, in particular, an electromagnetic arrangement and the abutment element may include, in particular, at least one electromagnet 7 belonging to the aforesaid electromagnetic arrangement.

The electromagnetic arrangement (with electromagnet 7) may be, in particular, so configured that the emergency mode is triggered by an interruption to the electric supply to the electromagnetic arrangement.

The second force arrangement may include, in particular, a pneumatic actuator 9. The second force may include, in particular, a pneumatic force. The pneumatic force may be, in particular, exerted on the abutment portion 5 by a pneumatic actuator. The pneumatic actuator 9 may include, in particular, a dual-effect pneumatic actuator. The pneumatic actuator 9 may include, in particular, a linear actuator.

The pneumatic actuator 9 may be, in particular, so configured that energy accumulated in the pneumatic actuator is such that, when the emergency mode occurs (for example, in the event of an unexpected interruption to the electric energy supply), the pneumatic force is greater than the first force (for example, a magnetic force that becomes nil).

It is possible for the first force arrangement to include an electromagnetic arrangement (for example, with at least one electromagnet 7) and the second force arrangement to include a pneumatic actuator 9, in which a possible (anomalous) interruption to the electric energy supply to both the force arrangements will produce an immediate decrease (in practice, an almost instantaneous cancellation) of the first force exerted by the electromagnetic arrangement and, at the same time, also a decrease of the second force exerted by the pneumatic actuator 9, in which however a part of the pneumatic energy contained in the pneumatic actuator 9 continues to exert the second force by a greater amount than the first force.

In other embodiments (see FIGS. 11-15), the first force arrangement may include, in particular, a pneumatic actuator 10. The first force may include, in particular, a pneumatic force. The first pneumatic force may include, in particular, a pneumatic force exerted on an abutment portion of the cutting device 4 by a pneumatic actuator. This pneumatic actuator may include, in particular, a dual-effect pneumatic actuator. This pneumatic actuator may include, in particular, a linear pneumatic actuator.

The second force arrangement may include, in particular, an elastic element 11 (as in the embodiment of FIGS. 11-15). The second force may include, in particular, an elastic force. This elastic force may include, in particular, an elastic force exerted on the cutting portion by at least one spring.

It is possible to provide innumerable combinations of types of the first force and of the second force, like, in particular, electromagnetic and pneumatic force (embodiment of FIGS. 3-10), or pneumatic and elastic force (embodiment of FIGS. 11-15), or electromagnetic and elastic force, or hydraulic and elastic force, etc.

The cutting apparatus 1 may include, in particular, an adjusting device for adjusting the aforesaid operative position of the cutting portion 6. The adjusting device may include, in particular, a wedge coupling between a first element 12 and a second element 13 that is reciprocally positionable in an adjustable manner. It is possible to provide, in particular, for the first element 12 to act as an abutment element (performed by the electromagnet 7 in the embodiment of FIGS. 3-10) and the second element 13 to act as an abutment portion (performed by the abutment portion 5 in the embodiment of FIGS. 3-10).

The first element 12 and the second element 13 may be adjustable, for example, in a vertical direction (where the direction of the movement of the cutting portion 6 between the advanced cutting position and the retracted safety position is horizontal) or transverse (for example perpendicular) to the direction of the movement of the cutting portion 6 between the advanced cutting position and the retracted safety position. The regulation of the corresponding position between the first element 12 and the second element 13 may include, in particular, a micrometric adjustment, for example by a micrometric adjusting screw applied to one of the two elements.

Figure 16:
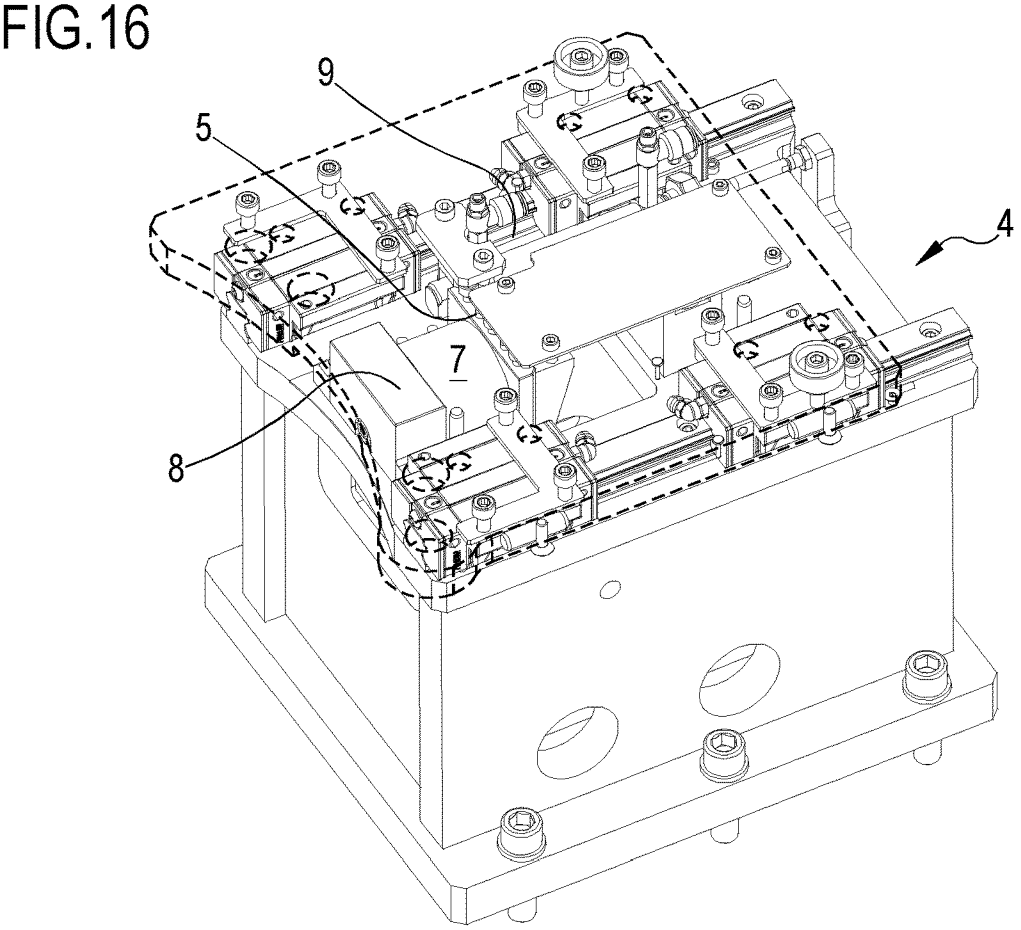
FIG. 16 is a perspective view of portions of the cutting device of a third embodiment of a cutting apparatus made according to the present invention in which the cutting device is in an advanced operative position.
Figure 17:
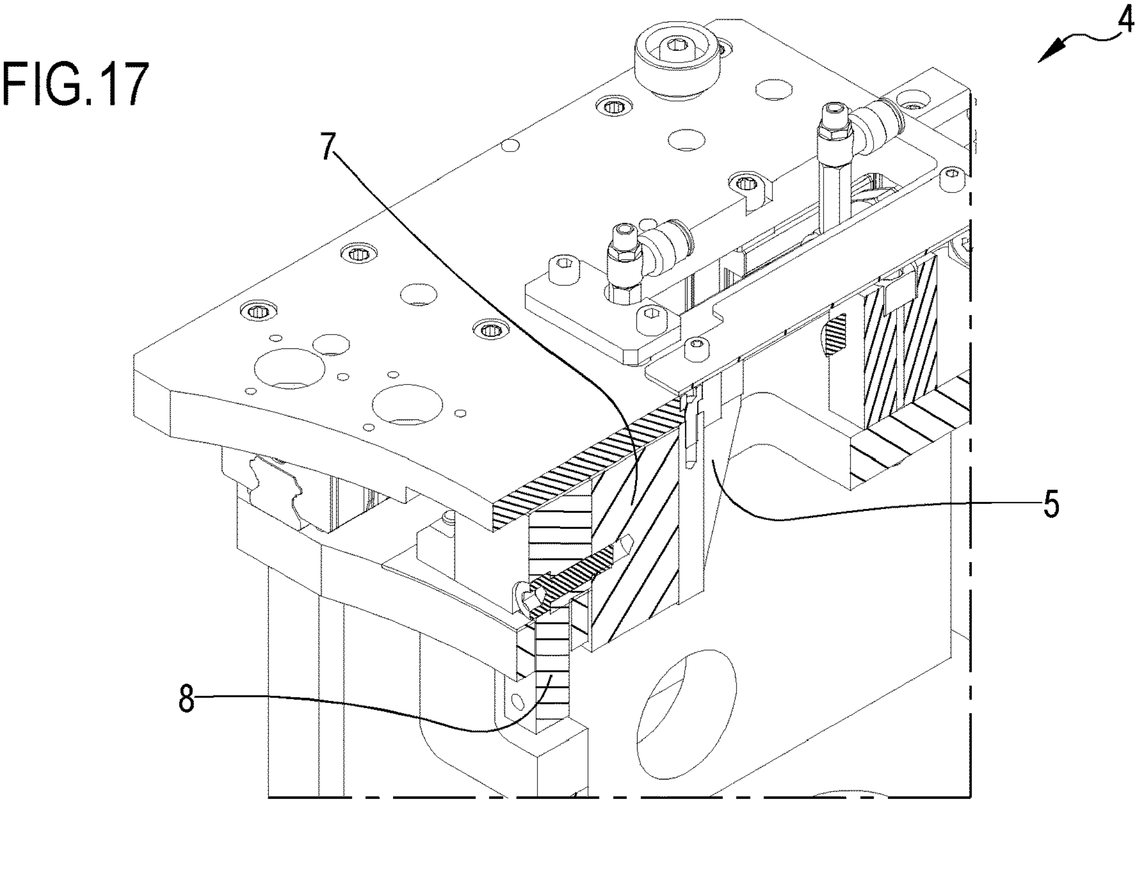
FIG. 17 is a section of the cutting device of FIG. 16.

The cutting device of FIGS. 16 and 17 differs from the cutting device of FIGS. 3-10 due to a different shape and arrangement of the electromagnetic arrangement. In fact, in the cutting device of FIGS. 3-10, the electromagnetic arrangement includes two electromagnets 7 arranged side by side, while in the cutting device of FIGS. 16 and 17 the electromagnetic arrangement includes a single electromagnet 7. The electromagnet 7 of the cutting device of FIGS. 16 and 17 may be fixed to the support 8 via a fixing device of the screw type (as can be seen from FIG. 17). More generally, it is possible to provide that the electromagnetic arrangement (for example, also the two electromagnets 7 of the cutting device of FIGS. 3-10) is fixed to the support 8 via a fixing device of the screw type.

Also in the embodiment of FIGS. 16 and 17 the cutting device 4 may assume at least one first configuration (shown in FIGS. 16 and 17, in which the cutting portion is not illustrated) in which the abutment portion 5 is arranged against at least one abutment element, which may form part of the electromagnetic arrangement, whereby, in this specific embodiment, the abutment element includes the single electromagnet 7.

Also in the version of FIGS. 16 and 17 the cutting device 4 may assume at least one second configuration (not shown), in which the cutting portion is in a safety position (retracted) distant from the path along which the capsule is transported in a manner that it does not interfere with the capsule and/or with the respective transport assembly.

The operation of the cutting apparatus 1 can actuate a method for cutting capsules. This method may include, in particular, the steps of transport a capsule along a path and cutting the capsule by at least one cutting portion 6 of a cutting device 4 whilst the capsule rolls on the cutting device 4 and the cutting portion 6 is arranged in an operative position.

This method may include, in particular, the step of exerting, during the aforesaid cutting step, a first force directed to maintain at least one abutment portion of the cutting device 4 abutting on at least one abutment element. The abutment portion may include, in particular, the abutment portion 5 (as in the first embodiment of FIGS. 3-10), or the second element 13 (as in the second embodiment of FIGS. 11-15), or still other types of abutment portions.

This method may include, in particular, the step of exerting, during the aforesaid step of exerting a first force, a second force directed to move the cutting portion 6 from the operative position to a safety position, in which the first force is greater than the second force so that a resulting force maintains the abutment portion of the cutting device 4 abutting on the abutment element and the cutting portion 6 in the cutting operative position of the capsule.

This method may include, in particular, the step of reducing the size of the first force, in the event of an anomalous situation, such that the first force becomes less than the second force, so that a force resulting from these forces moves the cutting portion 6 from the operative position to the safety position.

The cutting apparatus and method thus feature a safety system that preserves the capsules and/or the components of the apparatus, in particular the capsule-cutting elements and/or capsule-conveying spindles, also in the event of a block of the cutting apparatus or interruption of an interruption to the electricity supply or another emergency situation.

What is claimed is:

1. An apparatus for cutting capsules, said apparatus comprising:

a carousel rotating around a carousel axis;

two or more transport units carried by said carousel, each of which is configured to transport a capsule along a path defined by a rotation of said carousel;

at least one abutment element;

a cutting device which comprises at least one abutment portion and at least one cutting portion, said cutting device having at least one first configuration, in which said abutment portion is against said at least one abutment element and said cutting portion is in an advanced operative position in which said cutting portion is arranged along said path for cutting a capsule which is transported by the respective transport unit and which rolls on said cutting device, and at least one second configuration, in which said cutting portion is in a retracted safety position farther from said path than said advanced operating position so as not to interfere with the capsule and/or with the respective transport unit; said at least one abutment element being configured so that, when said abutment portion is against said at least one abutment element, said cutting portion is in said advanced operative position;

a first force arrangement for exerting a first force suitable for maintaining said at least one abutment portion against said at least one abutment element and said cutting portion in said operative position;, wherein said first force arrangement comprises an electromagnetic arrangement and said first force comprises an electromagnetic force, or wherein said first force arrangement comprises a pneumatic actuator and said first force comprises a pneumatic force;

a second force arrangement for exerting a second force suitable for moving said at least one cutting portion from said operative position towards said safety position, wherein said second force arrangement comprises a pneumatic actuator and said second force comprises a pneumatic force, or wherein said second force arrangement comprises an elastic element and said second force comprises an elastic force; and a controller configured to control said first force arrangement and said second force arrangement to operate with one of at least one operating control mode during a normal execution of a cut on a capsule and at least one emergency mode during an anomalous situation, in which said at least one operating control mode includes said first force and said second force being exerted simultaneously and said first force being greater than said second force, whereby the force resultant of said first force and said second force is directed towards said first configuration, and in which said at least one emergency mode includes at least said first force decreasing to become less than said second force, whereby the resultant force of said first force and said second force is directed towards said second configuration.

2. The apparatus according to claim 1, wherein, in said at least one second configuration, said controller is configured so that said first force is zero and/or said abutment portion is distant from said at least one abutment element.

3. The apparatus according to claim 1, wherein said anomalous situation includes an interruption in a power supply to said first force arrangement.

4. The apparatus according to claim 1, wherein, when said first force arrangement comprises an electromagnetic arrangement and said first force comprises an electromagnetic force, said electromagnetic arrangement is configured such that said anomalous situation includes an interruption of an electrical power supply to said electromagnetic arrangement.

5. The apparatus according to claim 4, wherein said electromagnetic arrangement includes said at least one abutment portion comprising ferromagnetic material and said at least one abutment element comprising an electromagnet.

6. The apparatus according to claim 1, wherein, when said second force arrangement comprises a pneumatic actuator and said second force comprises a pneumatic force, said pneumatic force is exerted on said at least one abutment portion by said pneumatic actuator.

7. The apparatus according to claim 6, wherein said pneumatic actuator is configured so that an energy stored in said pneumatic actuator is such that, at the onset of said at least one emergency mode, said pneumatic force is greater than said first force.

8. The apparatus according to claim 1, wherein, when said first force arrangement comprises a pneumatic actuator and said first force comprises a pneumatic force, said pneumatic force is exerted on said at least one abutment portion by said pneumatic actuator.

9. The apparatus according to claim 1, wherein, when said second force arrangement comprises an elastic element and said second force comprises an elastic force, said elastic element includes at least one spring.

10. The apparatus according to claim 1, comprising an adjustment device for adjusting said at least one operative position of said at least one cutting portion.

11. The apparatus according to claim 10, wherein said adjustment device comprises a first wedge element and a second wedge element being reciprocally positionable in an adjustable manner.

12. The apparatus according to claim 11, wherein said at least one abutment element comprises said first wedge element and said at least one abutment portion comprises said second wedge element.

* * * * *